US005132709A

United States Patent [19]

West

[11] Patent Number: 5,132,709

[45] Date of Patent: Jul. 21, 1992

[54] APPARATUS AND METHOD FOR CLOSED-LOOP, THERMAL CONTROL OF PRINTING HEAD

[75] Inventor: David A. West, Streamwood, Ill.

[73] Assignee: Zebra Technologies Corporation, Vernon Hills, Ill.

[21] Appl. No.: 749,923

[22] Filed: Aug. 26, 1991

[51] Int. Cl.$^5$ .......................................... G01D 15/00

[52] U.S. Cl. .............................. 346/76 PH; 400/120

[58] Field of Search .................... 346/76 PH; 400/120

[56] References Cited

U.S. PATENT DOCUMENTS

| | | | |
|---|---|---|---|
| 4,330,786 | 5/1982 | Hatabe et al. | 346/76 PH |
| 4,434,354 | 2/1984 | Nakata | 219/216 |
| 4,434,356 | 2/1984 | Craig et al. | 219/216 |
| 4,502,056 | 2/1985 | Matsuda | 346/76 PH |
| 4,531,134 | 7/1985 | Horlander | 346/76 PH |
| 4,535,340 | 8/1985 | Moriguchi et al. | 346/76 PH |
| 4,540,991 | 9/1985 | Kariya et al. | 346/76 PH |
| 4,573,058 | 2/1986 | Brooks | 346/76 PH |
| 4,590,491 | 5/1986 | Hori et al. | 346/76 PH |
| 4,594,501 | 6/1986 | Culley et al. | 219/492 |
| 4,642,657 | 2/1987 | Asakura | 346/76 PH |
| 4,679,053 | 7/1987 | Katsurai et al. | 346/1.1 |
| 4,684,959 | 8/1987 | Mori et al. | 346/76 PH |
| 4,724,033 | 2/1988 | Vanderpool et al. | 156/365 |
| 4,724,336 | 2/1988 | Ichikawa et al. | 307/519 |
| 4,758,966 | 7/1988 | Brooks et al. | 364/519 |
| 4,782,202 | 11/1988 | Sawae et al. | 219/68 |
| 4,783,667 | 11/1988 | Brooks | 346/76 PH |
| 4,798,483 | 1/1989 | Inaba | 346/76 PH |
| 4,813,802 | 3/1989 | Gilham et al. | 400/74 |
| 4,873,536 | 10/1989 | Minowa et al. | 346/76 PH |
| 4,887,092 | 12/1989 | Pekruhn et al. | 346/1.1 |
| 4,897,557 | 1/1990 | Krause | 307/134 |
| 5,023,626 | 6/1991 | Kawamura | 346/76 PH |

*Primary Examiner*—Benjamin R. Fuller
*Assistant Examiner*—Huan Tran
*Attorney, Agent, or Firm*—Emrich & Dithmar

[57] ABSTRACT

The heating elements of a thermal printing head are respectively driven through drive transistors under the control of strobe pulses and are respectively provided with temperature control circuits, each such circuit including a sense resistor connected in series between the heating element and the drive transistor for sensing the current flow therethrough. Each control circuit has a flip-flop which is clocked by an associated strobe signal to turn on the corresponding drive transistor. The voltage drop across the sense resistor of each control circuit is amplified and compared to a reference level corresponding to a predetermined temperature, and when it exceeds the reference it resets the associated flip-flop to turn off the corresponding drive transistor.

16 Claims, 1 Drawing Sheet

APPARATUS AND METHOD FOR CLOSED-LOOP, THERMAL CONTROL OF PRINTING HEAD

BACKGROUND OF THE INVENTION

1. Field of the Invention

This invention relates to apparatus and methods for driving a thermal printing head and, more particularly, to elements of the printing head.

2. Description of the Prior Art

The printing head apparatus commonly used in thermal printing consists of an array of resistive heating elements selectively active under the control of digital circuitry which may be mounted on the printing head substrate. Heat from each selected element produces a printed "dot", and all of the selected elements cooperate to produce a printed line pattern directly on heat sensitized media, or via a heat sensitive ribbon in the case of thermal transfer printing. As the printer mechanism moves the medium perpendicular to the printing head, the array of heating elements is repeatedly loaded with data and activated to print a sequence of lines to produce a printed image.

The image information consists of a binary data stream which is loaded into a data shift register in serial fashion. Once loaded, each data bit controls a single heating element. A strobe signal activates all the heating elements that have a corresponding control bit that has been set to a logical value of 1. The energy received by the activated heating elements is controlled by the length of the strobe signal and the voltage applied to the elements, which voltage is the same for each element. It is often necessary to have some heating elements receive more energy than others. Thus, if a particular heating element has been recently heated, it will retain some of that heat and require less energy to produce a well-printed dot. Alternatively, a heating element that has been not been heated recently will require more energy to produce the same well-printed dot. As print speeds increase, less cooling time is available between print lines, and the different energy requirements of cool and hot heating elements become greater. Overheating of a heating element degrades print quality and also can cause destruction of the heating element.

Thus, the printing process requires a precise control of heating element temperature to achieve optimum print quality and, therefore, some means of individually controlling printing element energy is required. The digital nature of current printing head designs makes this control difficult, since all active heating elements receive the same voltage and the same strobe signal ON time. The most common control approach involves loading and strobing the printing head multiple times for each print line. Thus, a hot heating element (one that has recently printed) may be activated for only one load and strobe cycle, while a cold heating element may be activated on every load and strobe cycle for the current print line. A digital history memory is used to store the data from past print lines. This stored data can then be used to determine how long it has been (in terms of print lines) since a heating element has been activated and for how many strobe cycles it should be activated to achieve optimum printing temperature. In general, the larger the history memory and the more load and strobe cycles per print line, the better the heat control and the better the print quality. Up to seven line history memories and four head load cycles per print line have been used. The complexity, speed and cost of such circuitry can be considerable.

In order to eliminate the need for history memories and multiple head loads, a system has been devised to provide for each heating element a thermal control circuit to effectively vary the length of the strobe signals which control the heating of each heating element. Such a system is disclosed in U.S. Pat. No. 4,330,786 which provides an integrating circuit of a resistor and capacitor to electrically simulate the change of temperature of the heating element. The capacitor voltage is compared to a reference which corresponds to a predetermined temperature, and when it exceeds the reference it activates a circuit for turning off the drive transistor. But this temperature control circuit is relatively complicated and provides a control signal which is only indirectly related to the temperature of the heating element.

SUMMARY OF THE INVENTION

It is a general object of the present invention to provide an improved control circuit for a thermal printing head which avoids the disadvantages of prior control circuits while affording additional structural and operating advantages.

An important feature of the invention is the provision of a drive circuit for a thermal printing head heating element which controls the length of time that the heating element is driven in direct response to the temperature of the heating element.

A further feature of the invention is the provision of a drive circuit of the type set forth which includes a closed-loop feedback control circuit which feeds back from the heating element a signal directly related to its temperature for controlling the heating element drive.

In connection with the foregoing feature, another feature of the invention is the provision of a drive circuit of the type set forth, in which the heating element has a predetermined temperature coefficient, and in which the magnitude of the current flow through the heating element is sensed to control the heating element drive.

Another feature of the invention is the provision of an apparatus comprising a plurality of drive circuits of the type set forth for respectively controlling the heating elements of a thermal printing head.

Still another feature of the invention is the provision of a method of controlling a thermal printing head which incorporates the closed-loop temperature feedback technique effected by the apparatus of the type set forth.

These and other features of the invention are attained by providing a drive circuit for controlling the operation of a heating element in a thermal printing head in accordance with an associated strobe signal, the drive circuit comprising: electronic switch means adapted to be coupled to an associated power source and coupled to the heating element for controlling the flow of electric current therethrough, sensing means coupled to the heating element for generating a sense signal directly related to the temperature of the heating element, and control means coupled to the sensing means and to the switch means and responsive to the sense signal and to the strobe signal for controlling the operation of the switch means.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
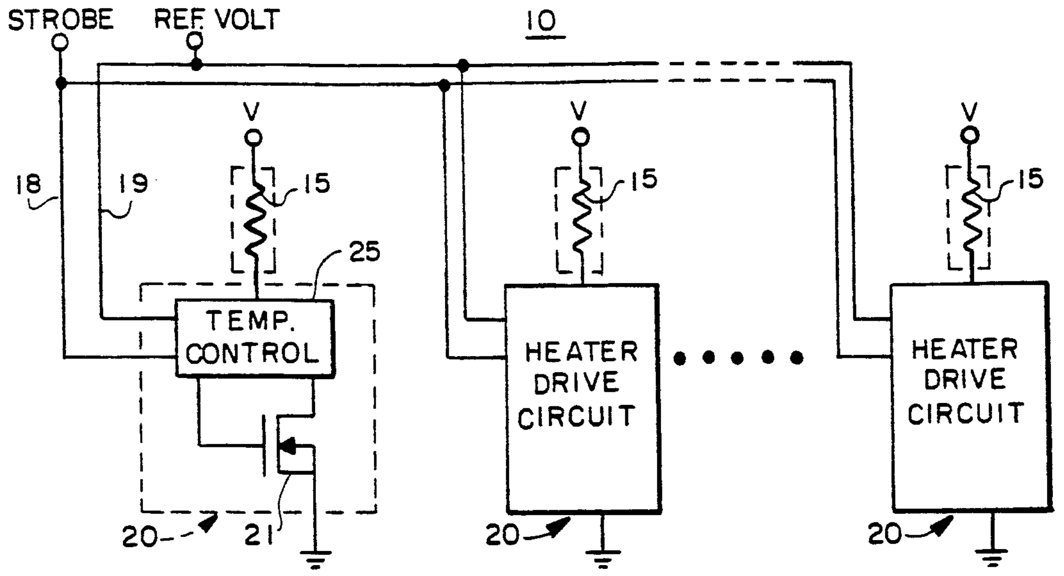
FIG. 1 is a partially block and partially schematic circuit diagram of a thermal printing head including heating element drive circuits in accordance with the present invention.

Referring to FIG. there is illustrated a thermal printing head generally designated by the numeral 10, which includes a plurality of heating elements 15, three being shown for purposes of illustration. Each of the heating elements 15 is preferably a heater resistor which has a known temperature coefficient and is monotonic and fairly linear in the range of interest. In the illustrated embodiment, the heater resistors have negative temperature coefficients, i.e., the resistance decreases as the temperature rises. Each heating element 15 has one terminal thereof coupled to a head voltage V and has the other terminal thereof connected to a corresponding one of a plurality of heater drive circuits 20 of identical construction, each of the heater drive circuits 20 also being connected by conductors 18 and 19, respectively, to a source of strobe signals and a reference voltage.

Figure 2:
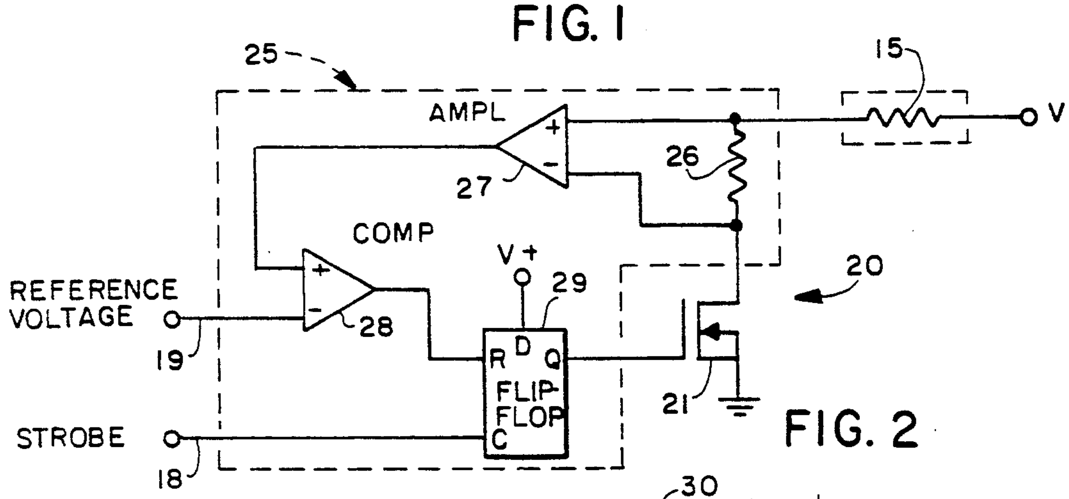
FIG. 2 is a schematic circuit diagram of one of the heating elements of FIG. 1 and its associated drive circuit.

Referring also to FIG. 2, each of the heater drive circuits 20 includes a drive transistor 21, which may be an insulated-gate, field-effect transistor having its source grounded and having its drain coupled to the heating element 15 through a temperature control circuit 25. More specifically, the temperature control circuit 25 includes a sense resistor 26 which is connected in series between the heating element !5 and the drain terminal of the transistor 21. The terminals of the sense resistor 26 are respectively connected to the inverting and non-inverting terminals of an amplifier 27, the output of which is connected to the non-inverting terminal of a comparator 28, the inverting terminal of which is connected via the conductor 19 to the reference voltage source. The output of the comparator 28 is connected to the RESET input terminal of a FLIP-FLOP 29, the CLOCK input terminal of which is connected via the conductor 18 to the strobe signal source. The D terminal of the flip-flop 29 is tied to a V+supply voltage. The Q output of the flip-flop 29 is connected to the gate terminal of the drive transistor 21.

Figure 3:
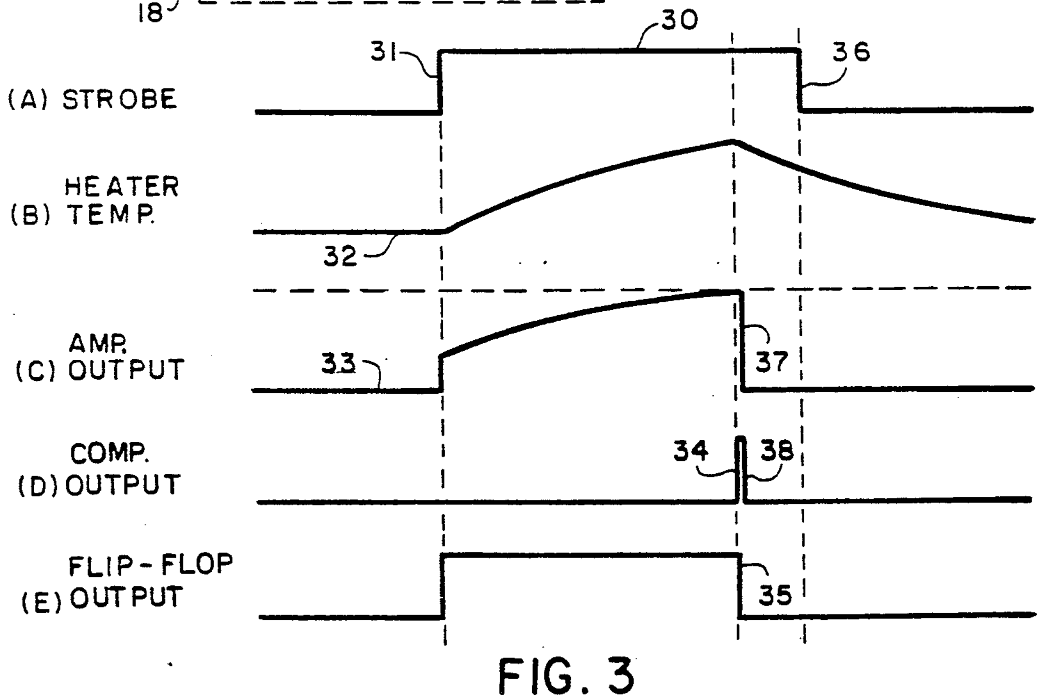
FIG. 3 is a series of waveform diagrams illustrating the operation of the circuitry of FIG. 2.

Referring now also to FIG. 3, the operation of the thermal printing head 10 will be described. Waveform A in FIG. 3 illustrates a typical strobe pulse 30, which is generally in the nature of a rectangular pulse having a rising edge 31. In the operation of a standard prior art thermal printing head, the strobe signal would be applied directly to the gate terminal of the transistor 21, and when the strobe pulse 30 is high the transistor 21 would be gated ON to allow current flow through the heating element 15 for the duration of the strobe pulse 30. Since all strobe pulses 30 are of the same length or duration, it is difficult to control the temperature of the heating element 15. In the present invention, the strobe pulse 30 is applied to the CLOCK terminal of the flip-flop 29, the rising edge 31 triggering the Q output thereof to go high, as illustrated in waveform E of FIG. 3, thereby gating the transistor 21 ON.

When current flows through the heating element 15 it also flows through the sense resistor 26, which has a known fixed resistance. Thus, the voltage drop across the sense resistor 26 is directly proportional to the current flow therethrough and through the heating element 15. The current flowing through the heating element 15 causes it to heat up, as indicated at 32 in waveform B of FIG. 3. Since the heating element 15 has a negative temperature coefficient, as its temperature rises, its resistance will drop and the current therethrough will increase. Thus, the voltage drop across the sense resistor 26 is directly related to the temperature of the heating element !5. The magnitude of the voltage drop across the sense resistor 26, which is directly related to the magnitude of the current therethrough, is amplified and scaled by the amplifier 27, the output of which constitutes a sense signal 33, indicated in waveform C of FIG. 3, which is directly related to the temperature of the heating element 15.

The output of the comparator 28 is normally low, as illustrated in waveform D of FIG. 3. When the sense signal 3 at the output of the amplifier 27 reaches the reference voltage level which corresponds to a predetermined temperature of the heating element !5, the output of the comparator 28 goes high, as indicated at 34 in waveform D of FIG. 3, resetting the flip-flop 29 and causing the Q output thereof to go low, as indicated at 35 in waveform E of FIG. 3, thereby turning off the drive transistor 21 and interrupting the flow of current through the heating element 15. The amplifier output accordingly drops to zero, as at 37 in waveform C, thereby causing the comparator output to go back low, as at 38 in waveform D. Thus, it can be seen that the heating element 15 is turned off, even though the strobe pulse 30 (which does not go low until 36 in waveform A) is still high, thereby effectively preventing overheating of the heating element 15.

It will be noted from waveform C that, when the transistor 21 is gated on, the output of the amplifier 27 does not rise gradually from its zero level, but rather jumps stepwise. This indicates that the heating element !5 had not cooled down completely from its previous energization and, therefore, the initial current therethrough would be at a correspondingly elevated level. It will be appreciated that the hotter the heating element 15 when it is turned on and, therefore, the higher the initial current therethrough, the sooner the output of the amplifier 27 will reach the reference voltage level and turn off the drive transistor 21. The result is a printing head that has each printing element under individual self control.

As can be seen from waveform B of FIG. 3, when the drive transistor 21 is turned off, the heating element 15 begins to cool down at a predetermined rate. But the drive transistor 21 is not turned back ON until the next strobe pulse.

While in the illustrated embodiment, a fixed head voltage V is applied to the heating element !5 and the variable current is sensed by the sense resistor 26, it will be appreciated that, alternatively, a fixed current could be applied to the heating element 15, in which case the voltage drop across the heating element !5 would vary with temperature and could be directly sensed and applied to the input of the amplifier 27.

A significant aspect of the present invention is that the feedback voltage across the sense resistor 26 is directly related to the temperature of the heating element 15, i.e., it varies in direct response to the change in heating element temperature. This provides a simple, yet accurate temperature feedback signal for an effective closed-loop self regulation of the temperature of the heating element 15.

From the foregoing, it can be seen that there has been provided an improved temperature control circuit for a thermal printing head drive circuit which eliminates overheating of the heating element and, therefore, provides improved print quality and protects the printing head from burnout due to overheating. The print speed is not limited by head heating and, therefore, variable speed printing is possible. It will also be appreciated that the analog reference voltage may act as a darkness adjustment for the printing head.

I claim:

1. A drive circuit for controlling a variable temperature heating element in a thermal printing head in accordance with an associated strobe signal, said drive circuit comprising: electronic switch means adapted to be coupled to an associated power source and coupled to the heating element for controlling electric current therethrough, sensing means coupled to the heating element and responsive to the current therethrough for generating a sense signal directly related to the temperature of the heating element, and control means coupled to said sensing means and to said switch means and responsive to said sense signal and to the strobe signal for controlling said switch means.

2. The drive circuit of claim 1, wherein said electronic switch means includes a transistor, said sensing means comprising a sense resistor connected in series between said transistor and the heating element.

3. The drive circuit of claim 1, wherein said control means includes amplifying means coupled to said sensing means for amplifying said sense signal.

4. The drive circuit of claim 1, wherein said control means includes comparator means for comparing the sense signal to a reference level corresponding to a predetermined temperature and producing an output signal when the sense signal exceeds said reference level.

5. The drive circuit of claim 4, wherein said control means includes trigger means coupled to the output of said comparator means and to the associated strobe signal and having an output coupled to said switch means and responsive to said strobe signal for closing said switch means.

6. The drive circuit of claim 5, wherein said trigger means is responsive to said output signal for opening said switch means to interrupt the flow of current through the heating element.

7. An apparatus for controlling a thermal printing head having a plurality of variable temperature heating elements disposed in a predetermined pattern in accordance with associated strobe signals, said apparatus comprising: a plurality of drive circuits respectively associated with and coupled to the heating element for controlling operation of the heating elements, each of said drive circuits including electronic switch means adapted to be coupled to an associated power source and coupled to the associated one of the heating elements for controlling electric current therethrough, sensing means coupled to the heating element and responsive to the current therethrough for generating a sense signal directly related to the temperature of the heating element, and control means coupled to said sensing means and to said switch means and responsive to said sense signal and to the associated strobe signal for controlling said switch means.

8. The apparatus of claim 7, wherein said sensing means includes means for sensing the flow of current through the heating element.

9. The apparatus of claim 8, wherein said switch means includes a transistor, said sensing means including a sense resistor connected in series between the heating element and said transistor.

10. The apparatus of claim 7, wherein said control means includes comparator means for comparing the sense signal to a reference level corresponding to a predetermined temperature and generating an output signal when the sense signal exceeds the reference level.

11. The apparatus of claim 10, wherein said control means includes trigger means coupled to the output of said comparator means and to the associated strobe signal and having an output coupled to said switch means and responsive to the associated strobe signal for closing said switch means and responsive to said output signal for opening said switch means.

12. The apparatus of claim 7, wherein said control means includes amplifying means coupled to said sensing means for amplifying the sense signal.

13. A method of controlling a thermal printing head having a plurality of heating resistors disposed in a predetermined pattern and driven by respective drive circuits for causing currents of varying magnitude to flow therethrough in accordance with associated strobe signals, wherein each of said heating resistors has a resistance which varies with temperature in accordance with a predetermined temperature coefficient, said method comprising the steps of: sensing the magnitude of the current flow through each of the heating resistors and producing a plurality of sense signals respectively indicative thereof, comparing each of said sense signals to a reference level which corresponds to a predetermined temperature, and disabling each of the drive circuits when the sense signal for the heating resistor drives thereby exceeds the reference level.

14. The method of claim 13, wherein the sensing step includes sensing voltage drop across a sense resistor connected in series with the heating resistor.

15. The method of claim 13, and further comprising amplifying the sense signal before comparing it with the reference level.

16. The method of claim 13, and further comprising turning on each of said drive circuits in response to an associated strobe signal and turning off each of said drive circuits when a corresponding sense signal exceeds the reference level.

* * * * *

UNITED STATES PATENT AND TRADEMARK OFFICE
CERTIFICATE OF CORRECTION

PATENT NO. : 5,132,709

DATED : July 21, 1992

INVENTOR(S) : David A. West

It is certified that error appears in the above-identified patent and that said Letters Patent is hereby corrected as shown below:

Column 6, line 3, "element" should be --elements--;

line 54, "drives" should be --driven--; and line 65, "the" should be --a--.

Signed and Sealed this

Seventh Day of September, 1993

Attest:

BRUCE LEHMAN

*Attesting Officer* *Commissioner of Patents and Trademarks*